(12) United States Patent
Hansen et al.

(10) Patent No.: US 8,241,732 B2
(45) Date of Patent: Aug. 14, 2012

(54) TRANSFER FILM (75) Inventors: Achim Hansen, Zug (CH); Rene Staub, Hagendorn (CH); Juri Attner, Burgthann (DE)

(73) Assignee: OVD Kinegram AG, Zug (CH)

( * ) Notice: Subject to any disclaimer, the term of this patent is extended or adjusted under 35 U.S.C. 154(b) by 992 days.

(21) Appl. No.: 11/911,289

(22) PCT Filed: Apr. 11, 2006

(86) PCT No.: PCT/EP2006/003322
§ 371 (c)(1), (2), (4) Date: Apr. 18, 2008

(87) PCT Pub. No.: WO2006/108611
PCT Pub. Date: Oct. 19, 2006

(65) Prior Publication Data
US 2010/0151207 A1    Jun. 17, 2010

(30) Foreign Application Priority Data
Apr. 13, 2005  (DE) .................. 10 2005 017 170

(51) Int. Cl.
*B32B 3/00* (2006.01)
*B32B 7/12* (2006.01)
*B32B 15/04* (2006.01)
*B32B 7/06* (2006.01)

(52) U.S. Cl. ........ 428/172; 428/161; 428/914; 428/343; 428/354; 428/201; 428/202

(58) Field of Classification Search .................. 428/156, 428/166, 167, 161, 914, 915, 41.8, 42.2, 428/42.3, 43, 40.1, 343, 352, 354, 42.1, 41.7, 428/916, 201, 202; 283/103, 100; 359/576, 359/2, 558, 563, 566, 569; 427/7, 146, 147
See application file for complete search history.

(56) References Cited

U.S. PATENT DOCUMENTS

| 2,587,594 | A |   | 3/1952  | Chavannes et al. |
| 3,882,207 | A |   | 5/1975  | Hannan et al. |
| 4,629,647 | A |   | 12/1986 | Sander |
| 4,837,072 | A | * | 6/1989  | Kraetschmer ................ 428/201 |
| 4,874,213 | A |   | 10/1989 | Cowan |

(Continued)

FOREIGN PATENT DOCUMENTS

CA    2462924 A1    4/2003

(Continued)

OTHER PUBLICATIONS

Opposition Proceedings in related German Patent Application No. De 102005017170 B4 mailed Nov. 18, 2010.

(Continued)

*Primary Examiner* — Catherine A Simone
(74) *Attorney, Agent, or Firm* — Hoffmann & Baron, LLP (57) ABSTRACT

Described is a transfer film, in particular a hot embossing film, which includes a carrier film and a transfer layer portion having a structure layer, the transfer layer portion being arranged on the carrier film and being detachable from the carrier film, wherein it is provided that the carrier film has a master relief structure on its side towards the structure layer and the structure layer on its side towards the carrier film has a relief structure complementary to the master relief structure of the carrier film. There is further provided a process for the production of the transfer film and a multi-layer body formed with the structure layer.

22 Claims, 5 Drawing Sheets

U.S. PATENT DOCUMENTS

| | | | |
|---|---|---|---|
| 5,279,689 A * | 1/1994 | Shvartsman | 156/220 |
| 5,344,681 A | 9/1994 | Calhoun et al. | |
| 6,369,947 B1 | 4/2002 | Staub et al. | |
| 6,524,675 B1 * | 2/2003 | Mikami et al. | 428/40.1 |
| 6,761,959 B1 * | 7/2004 | Bonkowski et al. | 428/156 |
| 6,906,861 B2 | 6/2005 | Tompkin et al. | |
| 7,002,746 B2 | 2/2006 | Schilling et al. | |
| 7,680,274 B2 * | 3/2010 | Tompkin et al. | 380/54 |
| 2004/0057113 A1 | 3/2004 | Tompkin | |
| 2005/0082819 A1 | 4/2005 | Tompkin et al. | |
| 2006/0072225 A1 | 4/2006 | Schilling et al. | |
| 2006/0119912 A1 * | 6/2006 | Kutsch et al. | 359/2 |
| 2007/0035053 A1 | 2/2007 | Schulz et al. | |

FOREIGN PATENT DOCUMENTS

| | | |
|---|---|---|
| CA | 2506838 A1 | 6/2004 |
| DE | 2350109 | 4/1974 |
| DE | 2701176 | 12/1977 |
| DE | 3337458 A1 | 4/1985 |
| DE | 3422908 C2 | 4/1986 |
| DE | 69227117 T2 | 5/1999 |
| DE | 19962641 A1 | 6/2001 |
| DE | 10054503 A1 | 6/2002 |
| DE | 10150293 A1 | 4/2003 |
| DE | 10216561 A1 | 10/2003 |
| DE | 10233831 A1 | 2/2004 |
| DE | 10254499 A1 | 6/2004 |
| DE | 10254500 A1 | 6/2004 |
| EP | 0064782 A2 | 11/1982 |
| EP | 0194042 | 9/1986 |
| EP | 0712012 | 5/1996 |
| EP | 1046515 A1 | 10/2000 |
| EP | 1182054 A2 | 2/2002 |
| EP | 1182055 A2 | 2/2002 |
| EP | 0992020 B1 | 3/2003 |
| GB | 130551 | 8/1919 |
| GB | 2122541 A | 1/1984 |
| WO | WO9200856 | 1/1992 |
| WO | WO 01/80175 | 10/2001 |
| WO | WO03084764 A2 | 10/2003 |
| WO | WO 2004/092789 A1 | 10/2004 |

OTHER PUBLICATIONS

European Opposition issued in European Patent Application No. 06724242.0 on May 14, 2012.

* cited by examiner

TRANSFER FILM

This application claims priority based on an International Application filed under the Patent Cooperation Treaty, PCT/EP2006/003322, filed on Apr. 11, 2006 and German Application No. 102005017170.2-45, filed on Apr. 13, 2005.

BACKGROUND OF THE INVENTION

The invention concerns a transfer film, in particular a hot embossing film, which includes a carrier film and a transfer layer portion having a structure layer, the transfer layer portion being arranged on the carrier film and being detachable from the carrier film, a process for the production of such a transfer film and a multi-layer body.

By virtue of a suitable surface configuration it is possible to increase the utility value of technical objects, for example by the formation of reflection-reducing or dirt-repellent surfaces.

DE 199 62 641 describes a process for the production of a self-cleaning metallic surface, in which respect however the process is limited to metallic surfaces.

DE 102 33 831 A1 provides applying a hardenable substance as a carrier layer to the surface to be protected, by means of coating processes, applying nanoparticles to the carrier layer by means of coating processes and fixing the particles by hardening the carrier layer. The coating process suffers from the disadvantage that the coating result is dependent on the nature of the nanoparticles and the application process. There is the disadvantage that the operation of applying the nanoparticles is effected with a spray gun and that the nanoparticles can come loose from the carrier layer in long-term use. In addition the toxicological action of nanoparticles is scarcely investigated in terms of production, use and disposal, and that entails a risk factor.

SUMMARY OF THE INVENTION

Now the object of the invention is to provide an inexpensive process which is suitable for mass production for producing a multi-layer body with an outer structure layer, and a multi-layer body produced with that process.

The object of the invention is attained by a transfer film, in particular a hot embossing film, which includes a carrier film and a transfer layer portion having a structure layer, the transfer layer portion being arranged on the carrier film and being detachable from the carrier film, wherein it is provided that a master relief structure is shaped on the carrier film on its side towards the structure layer, and that the structure layer on its side towards the carrier film has a relief structure complementary to the master relief structure of the carrier film.

The object of the invention is further attained by a process for the production of a transfer film which includes a carrier film and a transfer layer portion having a structure layer, the transfer layer portion being arranged on the carrier film and being detachable from the carrier film, wherein it is provided that a master relief structure is shaped into the carrier film and/or a replication layer is applied to the carrier film and the master relief structure is shaped into the replication layer, that the structure layer is applied to the carrier film, wherein a relief structure complementary to the master relief structure of the carrier film is shaped into the structure layer, and that the relief structure is fixed by solidification or hardening of the structure layer.

Furthermore the object of the invention is attained by a multi-layer body comprising a structure layer, wherein the structure layer forms the front side of the multi-layer body and a relief structure is shaped into a first surface of the transparent structure layer, which forms the front side of the multi-layer body, wherein it is provided that the structure layer is of a thickness of <100 µm, preferably a thickness of <20 µm.

The present invention makes it possible to produce structure layers of very small layer thickness and to transfer them by means of the carrier film. In that respect the carrier film with the master relief structure provides for adequate mechanical stability and protection for the surface structure when applying the transfer layer portion to a surface to be protected.

The thickness of the transparent structure layer can be reduced by the invention so that no imaging defects are caused by same when it is applied to an optical system or to a display. The process according to the invention provides that relief structures produced on the structure layer can be produced exclusively in accordance with functional criteria. Furthermore it is possible to use apparatuses and process steps which are tried and tested in practice and which are suitable for mass production and to produce the structure layer in a roll-to-roll process.

As the first relief structure is arranged at the surface of the multi-layer body the multi-layer body can provide a technical surface protection for sensitive and delicate surfaces, preferably protection from soiling.

Further advantageous configurations are recited in the appendant claims.

It can be provided that the structure layer of the transfer film is of a thickness of <100 µm, preferably a thickness of <20 µm. That achieves inter alia the advantages already referred to above.

It can further be provided that the structure layer is transparent. It can however also involve an opaque and/or a colored structure layer which for example imitates the surface which is typical of a material. In that respect it is possible to imitate both the optical and also the tactile effect of the material.

An advantageous configuration provides that the master relief structure is formed by embossing in the carrier film. It can however also be provided that the carrier film has a replication lacquer layer in which the master relief structure is shaped for example by thermal embossing or UV embossing.

It can be provided that a release layer is arranged between the carrier film and the transfer layer portion. Such a release layer can be for example in the form of a wax layer, in which respect the thickness of the release layer is to be taken into consideration in the production of the master relief structure.

It can also be provided that a protective layer is arranged on the first relief structure. It can advantageously also be provided that the structure layer in the material is so selected that it forms a protective layer.

The relief structure is preferably a non-random relief structure. The term non-random relief structure is used to denote such a structure which is specifically and targetedly formed and which does not occur by virtue of random surface roughnesses of material surfaces. Thus non-random relief structures can be recognized in particular by virtue of the fact that they are specifically reproducible.

If for example a relief structure with a desired profile shape is produced for example on an industrial scale in an endless carrier film a suitably structured stamp, cylinder or the like which is of finite length is usually employed for that purpose. By virtue of the continuous use of the structured tool on the endless carrier film the shaped relief structures are repeated on the carrier film at regular spacings and are thus perceptibly non-random relief structures, even if at first glance a random relief structure appears locally to be present.

A non-random relief structure can also be recognized for example by virtue of the fact that given profile shapes which usually are not encountered or which are only very rarely encountered occur frequently, periodically or quasi-periodically. While a profile shape which is rather undefined and rounded is to be expected from a random relief structure such as a surface roughness, non-random relief structures present for example exact and geometrically formed profile shapes such as rectangular profiles, sawtooth profiles, hemispherical profiles, blaze structures or the like. In addition non-random relief structures present for example profiles with a profile depth which is of a staggered step-like configuration, of a constant profile depth like in particular the binary profiles described in DE 100 54 503 B4, and so forth.

A specific case of a step-like profile is for example a rectangular profile, in which case the local profile depths can only assume discrete levels. In that case the spacings between two adjacent depressions are preferably in the range of between 0.5 and 50 μm. The profile depth, in relation to a central level, is preferably <5 μm.

Microscopically fine, non-random relief structures with a locally varying structure depth are disclosed for example in EP 992 020 B1.

It has proven desirable if the complementary relief structure includes a microstructure, the dimensions of which are below the limit of resolution of the human eye.

The complementary relief structure can generally be in the form of a microstructure, the dimensions of which are below the resolution limit of the human eye, and/or in the form of a macrostructure which is visible to the human eye. In that case a macrostructure can be present beside a microstructure and/or can be superposed by a microstructure. In that case a microstructure can have an optical effect which simulates the presence of a macrostructure.

The complementary relief structure can be in the form of a matt structure and/or in the form of a diffractive structure and/or in the form of a refractive structure and/or in the form of a macrostructure.

The matt structure is a diffractive structure of a stochastic configuration so that incident light is randomly scattered. On a microscopic scale matt structures have fine relief structure elements which determine the scatter capability and which can be described with statistical parameters such as for example the mean roughness value Ra, correlation length Ic and so forth. Preferred matt structures involve a mean roughness value Ra in the range of between 20 nm and 2000 nm, preferably in the range of between 50 nm and 500 nm. The correlation length Ic is preferably in the range of between 200 nm and 50000 nm, in particular in the range of between 500 nm and 10000 nm.

Diffractive structures are structures which produce optical effects based on light diffraction, for example diffraction gratings or holograms. That can involve classic 2D/3D or 3D holograms which, based on a surface structure, permit the representation of three-dimensional information. Considered locally the profile of a holographically generated hologram such as for example a Fourier hologram can be considered as being approximately periodic, in which case typical numbers of lines are in the range of between 300 and 2000 l/mm and typical structure depths are in the range of between 50 and 800 nm.

A computer-generated hologram such as for example what is referred to as a kinoform can arouse the impression of a stochastic surface relief and can have an asymmetrical diffraction effect. A typical structure depth is half or a multiple of the wavelength of the incident light and depends on whether the kinoform is to produce its effect in a transmission or a reflection mode.

The refractive structures are structures which produce optical effects based on refraction of light, for example microlenses. Microlenses of that kind are usually not employed individually but arranged in a regular raster grid in mutually juxtaposed relationship.

Those structures are generally of dimensions which are below the resolution limit of the human eye.

The macrostructures are structures, the dimensions of which can be perceived by the human eye, for example design elements, which are formed by structure regions.

Such macrostructures can be produced for example by lens elements or especially shaped relief structures which have an optical-diffraction effect and which produce a visible lens-like effect, such as in particular relief structures in accordance with DE 102 54 499 B4 or DE 102 54 500 B4. In that case the macroscopically visible structure is essentially simulated by means of relief structures which have an optical-diffraction effect and which cannot be resolved by the eye. In addition a macrostructure can be designed in accordance with DE 102 16 561 A1, which is a function that is at least portion-wise steady and differentiable, which is curved at least in partial regions, and the adjacent extreme values of which are spaced at least 0.1 mm from each other.

Macrostructures which are superposed with a microstructure are to be found for example in WO 03/084764 A2. Described there is a diffraction structure which is formed by additive or subtractive superpositioning of a macroscopic structure with a microscopically fine relief profile.

Advantageous configurations provide that the relief structure is produced with an anti-reflection effect and/or as a diffuser and/or is adapted to be dirt-repellent. To produce a dirt-repellent relief structure it can further be provided that the structure layer is hydrophobic.

The above-mentioned properties of the relief structure can be afforded by the relief structure having a high depth-to-width ratio, preferably a depth-to-width ratio>1.

The dimension-less depth-to-width ratio is a characterizing feature of preferably periodic structures. Here the spacing between the highest and the lowest successive points of such a structure is referred to as the depth t, that is to say this involves the depth of a "trough". The spacing between two adjacent highest points, that is to say between two "peaks" is referred to as the width b. The width b is also referred to as the grating period when the relief structure is a diffraction grating. Now, the higher the depth-to-width ratio, the correspondingly steeper are the "peak" flanks. If the structure is a rectangular relief structure the "peak" flanks are of a vertical configuration.

The relief structure can be for example in the form of a linear grating or a cross grating, that is to say extend in a plane defined by x-y co-ordinates, in the x- and/or y-direction. The relief structure can also be a structure which is extended in three directions, for example a hexagonal grating.

It can be provided that the width or grating period of the relief structure is less than the light wavelength if this involves an optically active relief structure for dereflection of a surface. For the range of visible light, having regard to the maximum spectral sensitivity of the human eye, for the wavelength $\lambda$=555 nm, that means that the grating period b must be <550 nm. The minimum depth of the relief structure, that is necessary for good dereflection, must be at least in the order of magnitude of half a wavelength, that is to say t>275 nm.

To increase the mechanical stability of the relief structure it can also be provided that the relief structure is in the form of a macrostructure superposed by a microstructure. The macrostructure can involve a grating period which is 10 times to 100 times the wavelength of the incident radiation, that is to say for λ=550 nm b=5.5 μm to 55 μm. The aforementioned rules apply in regard to the dimensioning of the microstructure.

If the "peaks" are regularly distributed in the macrostructure unwanted directional effects can occur upon reflection of the incident radiation, such effects producing what is referred to as a moiré pattern. It can therefore preferably be provided that the "peaks" are distributed randomly in the macrostructure so that the radiation incident at the surface of the relief structure is completely diffusely reflected.

It can therefore further be provided that the relief structure is in the form of a diffuser. In that case the structure layer which is provided at the surface thereof with such a relief structure is in the form of a diffuser both in the incident light mode and also in the transmission light mode. The structure layer can be used for example as a matt screen for a reflex camera or as a back projection surface or as a surface of a display. In all those cases it provides that the light which is radiated back or which is radiated through is perceptible in a large solid angle.

In a further advantageous configuration it can be provided that the relief structure is formed with microlenses, the refractive index of which varies in order thus to diffusely deflect light. That optical effect which is known as index gradation or as the GRIN effect can be produced for example by means of photopolymer material. In that case monomers diffuse into regions which are polymerized by light so that a position-dependent refractive index is formed in each microlens. Such a photopolymer material are photopolymerizable monomers or oligomers or mixtures of photopolymerizable monomers and oligomers. They include epoxy resins, allyls, vinyl ethers and other vinyl-bearing organic monomers as well as acrylates and methacrylates. It is possible to add to the photopolymer material a photoinitiator which starts polymerization under the action of light and an inhibitor which prevents polymerization below a threshold value of the strength of the light, for example oxygen.

It can preferably be provided that the diameter of the microlenses is between 3 μm and 80 μm, further preferably between 5 μm and 50 μm.

The relief structure however can also be of such a configuration that it scatters light in a predetermined angular range. By virtue of using relief structures with an asymmetrical profile it is also possible in that case to achieve asymmetrical light distribution phenomena.

A dirt-repellent relief structure is formed by being produced on hydrophobic material and by the grating period being selected to be less than the mean dimensions of the particles of dirt. Fine particles of dirt which are of dimensions of the order of magnitude of between 2 and 5 μm are bound by drops of water which roll down, and are thus removed from the relief structure. In that respect the fine raised portions of the relief structure already have a hydrophobic effect because the water is unable to wet the relief structure, by virtue of the surface tension of the water.

In particular the combination of the aforementioned effects permits solutions which for example go markedly beyond the known state of the art for dereflecting the surfaces of optical components by interference layers.

It can further be provided that the structure layer according to the invention is also subsequently applied to optical structural units provided with conventional dereflection. The multi-layer body according to the invention can advantageously also be provided for displays and photovoltaic elements.

It can further be provided that the structure layer is in the form of an optical component or part of an optical component. That can involve for example a Fresnel lens which, in spite of its flat nature, can deploy the optical effect of a convex lens of substantially greater thickness. For example a Fresnel lens of that kind can be integrated into a bookmark or marker intended for a periodical or magazine and can thus enable people with restricted powers of vision to read small text.

Applying the structure layer to an object which is to be provided with a technical surface is particularly simple and reliably possible because the structure layer, with an adhesive layer, forms a multi-layer body which, until it is applied to the surface of the object and still during the application process, is protected by the carrier film from damage to the surface structure. The adhesive is preferably a hot melt adhesive. The structure layer can thus be applied for example by means of a hot embossing process under the action of pressure and heat. Cold adhesives, pressure-sensitive adhesives and UV-hardenable adhesives can be provided as further adhesives. In that case it is advantageous for the surface of the carrier film, which in opposite relationship to the replication layer, to be provided with a release layer, thereby permitting the transfer film to be rolled up without the risk of the structure layer coming away from the carrier film when the transfer film is unrolled.

The adhesive however can also be applied to the object. The transfer operation can again be effected for example under the action of pressure and temperature. It is particularly advantageous for the pressure on the adhesive to be in a predetermined pattern, in particular in register relationship with the object to which the structure layer is to be transferred.

The multi-layer body provided with the structure layer according to the invention can be modified for many different tasks by being provided with further layers, besides the adhesive layer. It can be provided for example that the multi-layer body is adapted for measuring or detecting gases and/or liquids and/or solids for biological and/or medical uses. The multi-layer body can also be in the form of a security element for protecting documents and/or articles of values, for example structuring in the form of an identification or a logo being provided in its surface relief.

BRIEF DESCRIPTION OF THE DRAWINGS

The invention is described by way of example hereinafter by means of a number of embodiments with reference to the accompanying drawings in which.

DETAILED DESCRIPTION OF THE INVENTION

Figure 1:
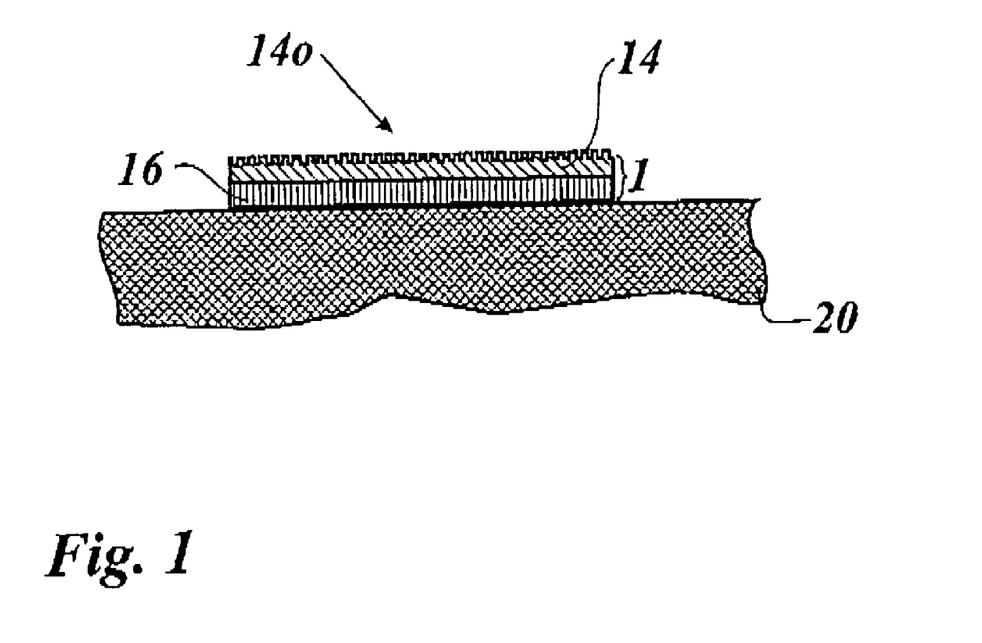
FIG. 1 is a diagrammatic view in section of a multi-layer body according to the invention applied to a carrier substrate.

FIG. 1 shows a multi-layer body 1 which is formed from a transparent structure layer 14 and an adhesive layer 16 on a carrier body 20. The carrier body 20 can be for example the front pane of a display.

The transparent structure layer 14, on its upper side remote from the adhesive layer 16, has a relief structure 14o. The relief structure 14o can be for example a reflection-reducing relief structure as described hereinafter with reference to FIGS. 3 and 4. The relief structure 14o can also involve a dirt-repellent relief structure which is described hereinafter with reference to FIGS. 5a and 5b.

It can further be provided that the relief structure 14o is in the form of a retroreflector. That can involve for example a partial region which is in the form of a logo.

The relief structure 14o can also be determined for relief representation by means of structures, the profile depth of which is limited to a predetermined value, similarly to a Fresnel lens. By virtue of the low level of reflection at the surface a relief structure of that kind causes only little interference with the view for example of a document therebeneath, but nonetheless it can be easily checked under suitable viewing conditions.

It can further be provided that the surface of the structure layer 14 has partial metalization or a dielectric layer.

Figure 2A:
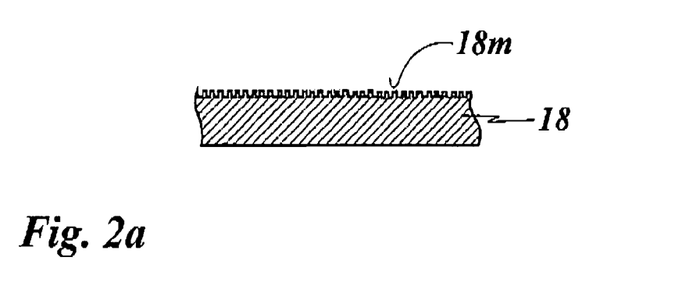
FIGS. 2a through 2c show diagrammatic views in section of production stages for the multi-layer body of FIG. 1.
Figure 2B:
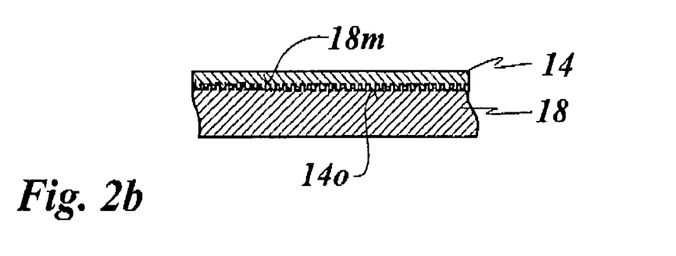
Figure 2C:
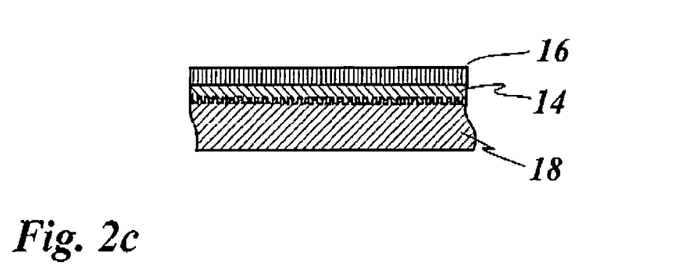

FIGS. 2a through 2c now show production stages for the multi-layer body 1 shown in FIG. 1.

FIG. 2a shows a carrier film 18 into which a master relief structure 18m is shaped. The carrier film 18 can be a polyester film or a polypropylene film or film of BOP, of a thickness of between 6 and 150 µm, preferably in the range of between 12 and 70 µm. The master relief structure 18m can be produced directly in the carrier film for example by hot embossing. For that purpose a heated embossing roller can be brought into contact with the carrier film.

In an intermediate step the master relief structure 18m can be partially provided with a metallic or dielectric layer by the layer being for example vapor-deposited in order to produce the structure layer 14 with partial coatings, as described hereinbefore.

A further configuration can provide that the carrier film 18 has a lacquer layer into which the master relief structure 18m is shaped. Particularly for producing especially fine or deep master relief structures 18m as are required for dereflected surfaces, it can be provided that this involves a UV-hardenable lacquer into which the master relief structure 18m is introduced by UV replication. The UV-hardenable lacquer can be set to be particularly fluid so that it can completely fill even very small cavities in the printing roller. The UV-hardenable lacquer can be hardened directly by UV light which is passed through the carrier film. The printing roller however can also involve an optical roller with which the master relief structure 18m is transferred by optical imaging, the UV lacquer is partially hardened and in a subsequent washing station unhardened UV lacquer is washed away.

The UV-hardenable lacquer can be for example one of the following lacquers: monomeric or oligomeric polyester acrylates, polyether acrylates, urethane acrylates or epoxy acrylates and amino-modified polyester acrylates, amino-modified polyether acrylates or amino-modified urethane acrylates.

It can however also be provided that the material is a thermoplastic lacquer which is replicated by means of hot embossing under pressure and temperature. This can involve for example a lacquer of the following composition:

| Component | Parts by weight |
|---|---|
| Methyl ethyl ketone | 400 |
| Ethyl acetate | 260 |
| Butyl acetate | 160 |
| Polymethyl methacrylate (Softening point about 170° C.) | 150 |
| Styrene copolymer (Softening point about 100° C.) | 30 |

As the above-described examples clearly show the process according to the invention makes it possible to influence the properties of the master relief structure within wide limits, in which respect suitable process steps can be used for mass production.

FIG. 2b now shows the replicated carrier film 18 to which the transparent structure layer 14 is applied over the full surface area. The structure layer 14 comprises a lacquer, particularly a thermoplastic lacquer or a UV-hardenable lacquer of a layer thickness of between 0.5 µm and 50 µm, preferably applied by means of a printing roller and is hardened after application. It is also possible for the lacquer to be applied by spraying, squeegee application or spin coating to the replicated carrier film.

The structure layer 14, for thicker structure layers>10 µm, can also comprise a thin PET carrier which is provided with a UV-hardenable lacquer and is bubble-free laminated onto the carrier film 18. The lacquer predominantly adheres to the thin PET and takes over the relief master structure 18m from the carrier film 18. The adhesive 16 can then be applied over the full surface area. The thin PET film which is now part of the structure layer 14 no longer breaks open in the known manner in the hot embossing operation. It can therefore be provided that the structure layer 14 is stamped on in the desired form and the regions of the structure layer 14, which are not to be transferred, are pulled off with the stamping grating. The form of the transfer is thus established by stamping and not by the transfer punch.

It is further possible for the structure layer 14 to be locally made up of different materials at the surface, by a procedure whereby different partial regions are applied by printing. It is particularly advantageous to apply different materials in register relationship with different relief structures 14o. In that way it is possible locally to implement the optimum combination of material and surface relief in a structure layer 14.

In that case the replicated carrier film acts as a mold for shaping the relief structure. In that respect the shaping quality can be improved by pressure and/or temperature when applying the structure layer. It is however also possible to provide a very viscous lacquer which can particularly well fill even very small cavities in the relief structure. In general it can be provided that the applied lacquer is hardened by drying, for example by thermal radiation or by contact with a heated body, for example a rotating roller. A dry roller can be provided in order to produce the structure layer with a particularly smooth rear side. When using UV-hardenable lacquer hardening of the structure layer can be particularly easily implemented with a transparent roller or from the front side of the carrier film.

It can also be provided that the structure layer is produced with a positionally dependent refractive index by UV hardening. The irradiation in pattern form, which is necessary for that purpose, can be produced for example by masks arranged between the radiation source and the structure layer or by the master relief structure.

Furthermore the structure layer can be produced with a predetermined refractive index, for example in order to avoid refraction between the structure layer and layers arranged therebeneath. Preferably the refractive index used is between 1.4 and 1.7 if the structure layer is applied to polymer substrates or optical glass.

Because the relief structure of the structure layer is exposed to the environment, it can also be provided that the structure layer is formed in such a way as to be particularly resistant to mechanical and/or chemical loadings and/or can be hydrophobic.

A particularly mechanically resistant UV-hardenable lacquer can be of the following composition:

| Component | Parts by weight |
|---|---|
| Methyl ethyl ketone | 30 |
| Ethyl acetate | 20 |
| Cyclohexanone | 5 |
| Polymethyl methacrylate (MW 60000 g/mol) | 18 |
| Dipentaerithritol pentaacrylate | 25 |
| Photoinitiator (e.g. Irgacure 1000 from Ciba Geigy) | 2 |

A UV-hardening hydrophobic lacquer is obtained of the following composition:

| Component | Parts by weight |
|---|---|
| Methyl ethyl ketone | 28 |
| Ethyl acetate | 20 |
| Cyclohexanone | 5 |
| Polymethyl methacrylate (MW 60000 g/mol) | 18 |
| Dipentaerithritol pentaacrylate | 25 |
| Photoinitiator (e.g. Irgacure 1000 from Ciba Geigy) | 2 |
| Polysiloxane resin | 2 |

FIG. 2c shows the third and at the same time last production stage for the multi-layer body 1 of FIG. 1, which is applied to the carrier film 18, involving the application of an adhesive layer 16 to the surface layer 14. The adhesive layer 16 can preferably be a melt adhesive.

It is possible for example to use an adhesive of the following composition,

| Component | Parts by weight |
|---|---|
| Methyl ethyl ketone | 550 |
| Ethyl acetate | 175 |
| Cyclohexanone | 50 |
| Polyurethane resin (Fp ≧ 200° C.) | 100 |
| Polyvinylchloride terpolymer (Tg = 90° C.) | 120 |
| Silicon dioxide | 5 |

Figure 2D:
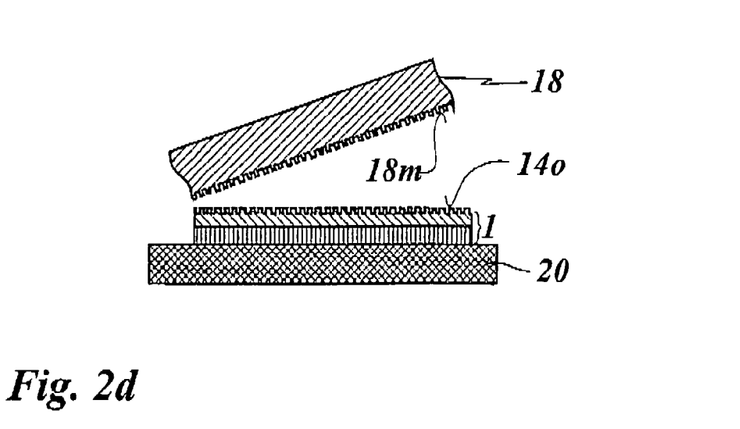
FIG. 2d shows the application of the multi-layer body of FIG. 2c to the carrier substrate.

FIG. 2d now shows the multi-layer body 1 which is applied to the carrier body 20 and from which the carrier film 18 is removed after application of the multi-layer body 1. The multi-layer body 1 and the carrier film 18 are turned through 180° relative to the position shown in FIGS. 2a through 2c so that the relief structure 14o now forms the top side of the multi-layer body 1, which is remote from the carrier body 18.

Detachability of the carrier film 18 from the multi-layer body 1 can be implemented by the material pairing of the carrier film 18 and the structure layer 14. It is however also possible to provide that disposed between the carrier film 18 and the structure layer 14 is a release layer which for example can be formed by a layer of wax. It will be noted however that the thickness of the release layer is to be taken into consideration when forming the master relief structure 18m of the carrier film 18. The structure layer 14 can also be in the form of a protective layer.

The above-described process is particularly well suited for a continuous roll-to-roll procedure in which the multi-layer body 1 is applied layer-wise to the carrier film 18 and structured.

Figure 3:
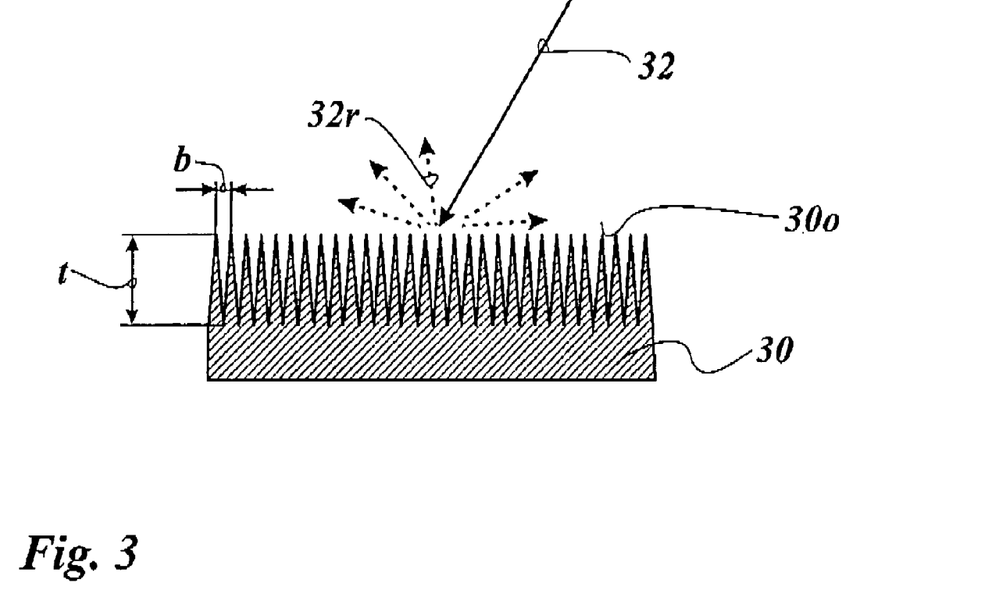
FIG. 3 shows a diagrammatic view in section of a first embodiment of a relief structure.

FIG. 3 now shows a first example of application of a structure layer 30 with a relief structure 30o in the form of a diagrammatic view in section. This involves a linear diffraction grating which is in the form of a sub-wavelength grating. The grating period of a sub-wavelength grating, that is to say the spacing between two "peaks", is less than the wavelength of light. The relief structure 30o has a high depth-to-width ratio.

The dimension-less depth-to-width ratio is a characterizing feature of preferably periodic structures. Here the spacing between the highest and the lowest successive points of such a structure is denoted as the depth t, that is to say this is the depth of a "trough". The spacing between two adjacent highest points, that is to say between "peaks", is identified as the width b. The width b is also referred to as the grating period. Now the higher the depth-to-width ratio the correspondingly steeper are the "peak" flanks. If this involves a rectangular relief structure, as shown in FIG. 1, the "peak" flanks are of a perpendicular configuration.

If now a light beam 32 impinges on the relief structure 30o, it is divided up into numerous reflected light beams 32r which each have in themselves a lower level of intensity than the light beam 32. Troublesome light reflections are prevented in that fashion. Periodic microstructures with an anti-reflecting action are also referred to as motheye structures. Besides linear gratings in particular cross gratings and hexagonal gratings are suitable for motheye structures.

Having regard to the maximum spectral sensitivity of the human eye, for the light wavelength λ=555 nm, the grating period of a relief structure which is reflection-reducing in the visible range must be b<550. The minimum depth of the relief structure, that is necessary for good dereflection, must be at least of the order of magnitude of half a light wavelength, that is to say in this embodiment about 350 nm.

Figure 4:
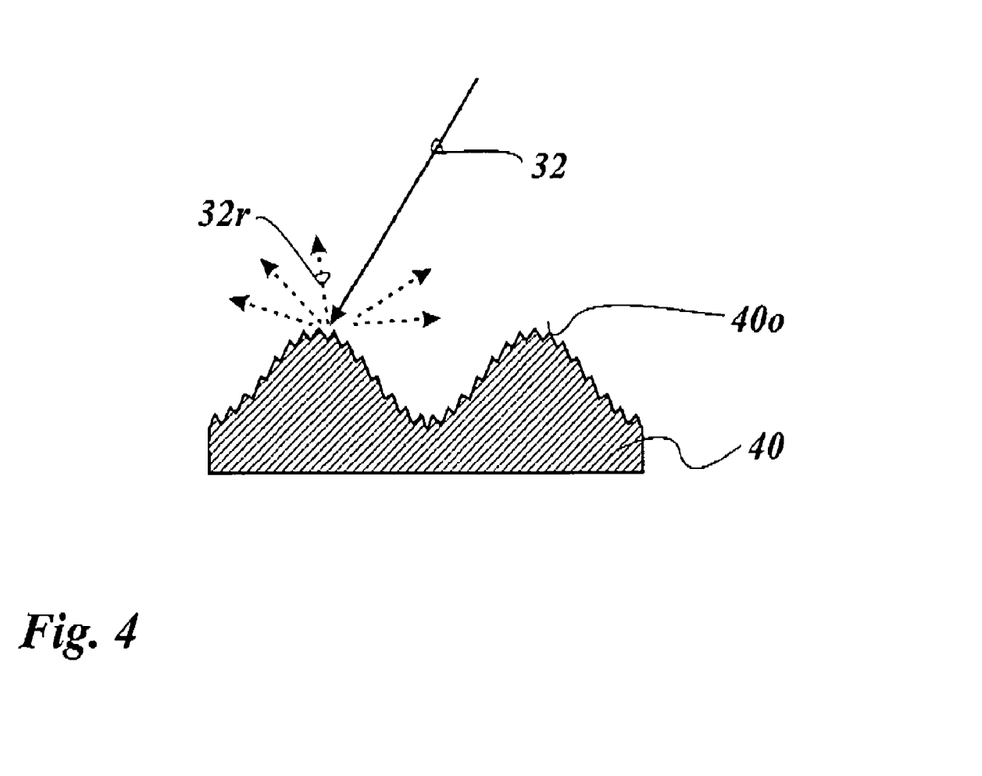
FIG. 4 shows a diagrammatic view in section of a second embodiment of a relief structure.

The relief structure 30o can be easily damaged by virtue of the structure elements which are very slender due to the high depth-to-width ratio. FIG. 4 shows a structure layer 40 with a relief structure 40o which avoids those disadvantages. As can be seen the relief structure 40o is a relief structure which is characterized by the superpositioning of a period macrostructure with a microstructure with a high depth-to-width ratio. The relief structure 40o acts with a reflection-reducing action like the relief structure 30o in FIG. 3 insofar as it splits up the incident light beam 32 into a plurality of diffusely reflected light beams 32r.

Figure 5A:
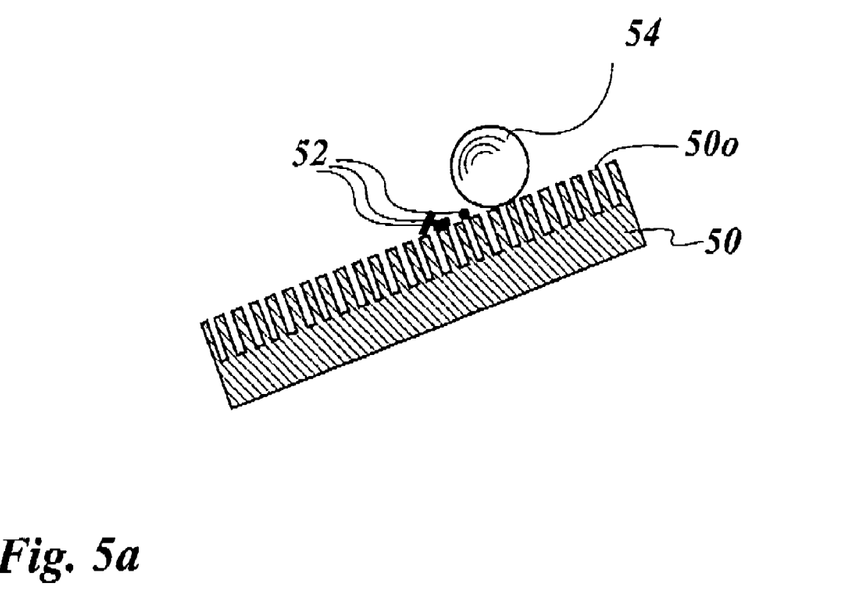
FIGS. 5a and 5b shows a diagrammatic view in section of a third embodiment of a relief structure.
Figure 5B:
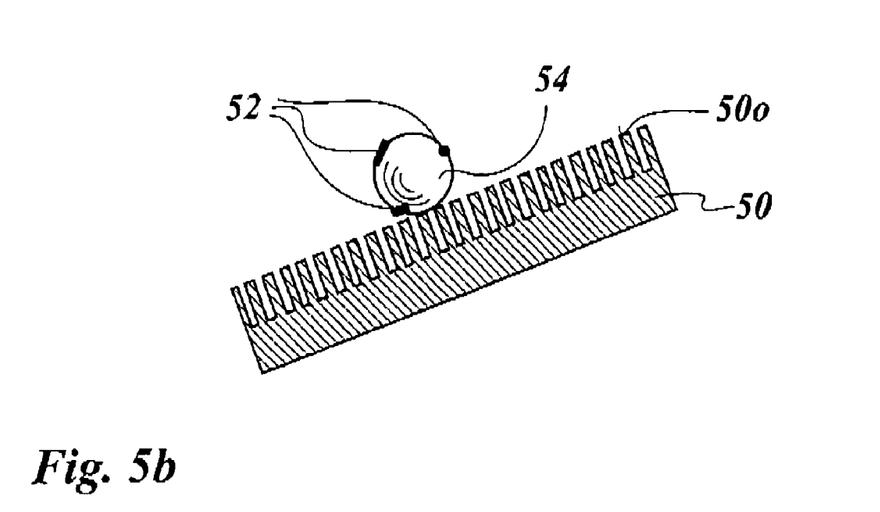

FIGS. 5a and 5b now show a structure layer 50 with a relief structure 50o which is in the form of a linear grating with a high depth-to-width ratio and with perpendicular flanks. The relief structure 50o is further of a hydrophobic nature.

FIG. 5a shows dirt particles 52 which are deposited on the surface of the relief structure 50o. A drop of water 54 can now roll down on the surface of the relief structure 50o, which surface is inclined with respect to the horizontal, and in so doing comes into contact with the dirt particles 52.

As shown in FIG. 5b the drop of water 54 exerts higher binding forces on the dirt particles 52 than the surface of the relief structure 50o. In that way the dirt particles 52 are bound to the drop of water 54 as it rolls down and are removed from the surface of the relief structure 50o.

Because relief structures with a high depth-to-width ratio can be of such a nature as to be both reflection-reducing and also dirt-repellent, that makes it possible to provide particularly effective protection for optical surfaces. In that respect the term optical surfaces is used to denote transparent surfaces which are arranged within an optical beam path. This can therefore involve for example the surfaces of a display or an optical imaging system but also the surfaces of security features which are applied to documents, identity cards, articles and so forth. For example identity cards in daily use can easily become dirty so that at least the external optical appearance of the identity card suffers. It can however also be the case that an optical security feature which is disposed under the surface of the identity card can no longer be read off without error if the surface is soiled.

Figure 6:
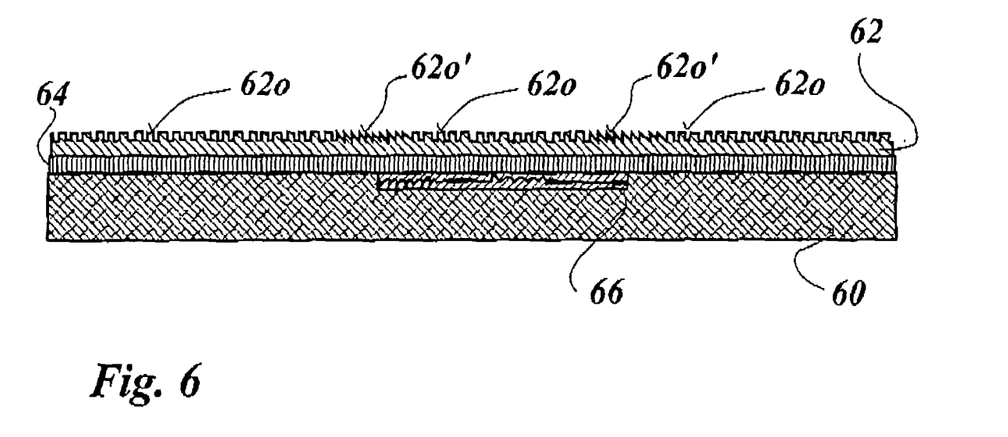
FIG. 6 shows a diagrammatic view in section of a first example of application.

FIG. 6 shows a diagrammatic view in section of an identity card 60 whose surface is coated with a structure layer 62 as described hereinbefore, with a reflection-reducing and dirt-repellent relief structure 62o. The structure layer 62 is non-releasably connected to the identity card 60 by an adhesive layer 64 and covers over inter alia an optical security element 66 which for example can have diffractive structures. The adhesive layer 64 can advantageously entail approximately the same refractive index as the structure layer 62.

Besides its protective function the structure layer 62 now also affords a forgery-resistant feature. The structure layer 62 is optically non-copyable and, because of its small thickness, cannot be detached from the identity card 60 without being destroyed and is therefore non-transferable.

The structure layer 62 advantageously has various regions involving differing structuring. In the embodiment illustrated in FIG. 6 this involves regions with a relief structure 62o' which differs from the relief structure 62o by virtue of its optical effect. The relief structure 62o' is of a ring shape in its macroscopic configuration and optically borders the security element 66.

The formation of the structure layer 62 with different relief structures 62o, 62o' can serve for the formation of a security feature, for example on the basis of the differences in the reflection capability, the grippiness or the wetting characteristics of the relief structures 62o and 62o'. The additional relief structure 62o' is advantageously introduced in the form of an identification such as for example a logo.

It can further be provided that regions of the structure layer 62 stand out from their surroundings on a tactile basis or have a pattern which can be detected by touch. The regions can be felt by virtue of properties such as hardness, elasticity, slip characteristics, thermal conductivity or stickiness or can have depressions or raised portions which can be detected by touch, which can form a pattern such as for example characters in braille or simple graphic logos such as for example squares, rhombuses, circles or stars. The regions can also be detectable by touch by being raised or recessed in relation to their surroundings.

It can also be provided that the tactile impression is combined with an optical impression, for example by virtue of a preferential orientation of the relief structure.

It can further be provided that the structure layer 62, after the application operation, is combined with subsequent overprinting, for example by means of intaglio or also in the form of blind embossing. That makes it possible to locally provide an additional feature which can be perceived by touch and which can also be provided for example for personalization.

Figure 7:
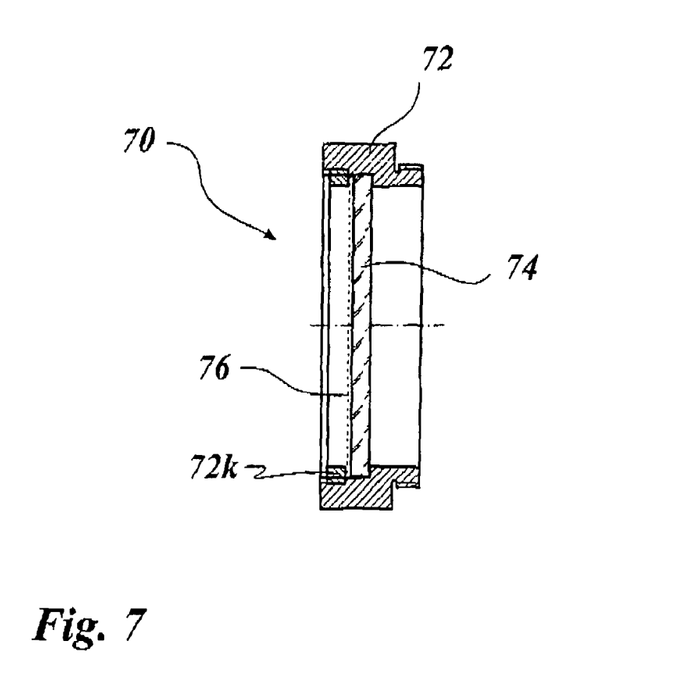
FIG. 7 shows a diagrammatic view in section of a second example of application.

FIG. 7 now shows a view in section of an optical screw-in filter 70 as can be used for example as an UV blocking filter for video cameras. The screw-in filter is substantially formed by an annular filter body 72 and a filter plate 74 which is fixed in the filter body 72 by a clamping ring 72k. The filter plate 74 is provided at its front side remote from the camera objective (not shown in FIG. 7) with a reflection-reducing and dirt-repellent structure layer 76. The structure layer 76 can be particularly well applied to the flat surface of the filter plate 74.

What is claimed is:

1. A transfer film, comprising:
a carrier film
a transfer layer portion having a structure layer, the transfer layer portion being arranged on the carrier film and being detachable from the carrier film, wherein a master relief structure is shaped on the carrier film on its side towards the structure layer and the structure layer on its side towards the carrier film has a relief structure complementary to the master relief structure of the carrier film, wherein the complementary relief structure includes a microstructure and wherein the structure layer is of a thickness<20 μm; and
an adhesive layer arranged on the transfer film on a side of the transfer film facing away from the carrier film, wherein the carrier film has a replication lacquer layer in which the master relief structure is shaped.

2. A transfer film as set forth in claim 1, wherein the structure layer is transparent.

3. A transfer film as set forth in claim 1, wherein at least one of a release layer is arranged between the carrier film and the transfer layer portion and a protective layer is arranged on the relief structure.

4. A transfer film as set forth in claim 1, wherein the relief structure in addition to the microstructure further includes a macrostructure.

5. A transfer film as set forth in claim 1, wherein the depth of the relief structure is at least one of in the form of a function of the co-ordinates x and/or y which varies periodically in the x-direction and/or in the y-direction, substantially in the form of a rectangular function of the co-ordinates x or y which varies periodically in the x-direction or in the y-direction and in the form of a sawtooth function of the co-ordinates x or y which varies periodically in the x-direction or in the y-direction.

6. A transfer film as set forth in claim 1, wherein the relief structure is formed with a depth-to-width ratio of >2.

7. A transfer film as set forth in claim 1, wherein the master relief structure is formed by superpositioning of a macrostructure with a microstructure.

8. A transfer film as set forth in claim 7 the macrostructure is in the form of a function of the co-ordinates x and/or y which periodically varies the depth of the macrostructure in the x-direction and/or in the y-direction.

9. A transfer film as set forth claim 7, wherein the spacing between two adjacent raised portions of the macrostructure is between 5 μm and 55 μm.

10. A transfer film as set forth in claim 7, wherein the carrier film has a thickness of 6 μm to 150 μm.

11. A transfer film as set forth in claim 1, wherein the carrier film has a thickness of 6 μm to 150 μm.

12. A transfer film as set forth in claim 1, wherein the relief structure is adapted to be reflection-reducing, wherein the spacing between two adjacent raised portions of the relief structure is less than the wavelength of the incident radiation.

13. A transfer film as set forth in claim 1, wherein the relief structure is adapted to be dirt-repellent, wherein the spacing between two raised portions of the relief structure<5 μm, the depth-to-width ratio is >2 and the structure layer is hydrophobic and/or oleophobic.

14. A transfer film as set forth in claim 1, wherein the structure layer is formed from different lacquers of the group including thermoplastic lacquer, thermally hardened lacquer and lacquer hardened by means of UV radiation.

15. A multi-layer body comprising a structure layer, wherein the structure layer forms a front side of the multi-layer body and is formed by means of a transfer film as set forth in claim 1, wherein the complementary relief structure is shaped into a first surface of the structure layer, which forms the front side of the multilayer body, and wherein the structure layer is transparent.

16. A multi-layer body as set forth in claim 15, wherein the structure layer is formed from different lacquers of the group including thermoplastic lacquer, thermally hardened lacquer and lacquer hardened by means of UV radiation.

17. A multi-layer body as set forth in claim 15, wherein the first surface is locally formed from different lacquers in particular in register relationship with different complementary relief structures.

18. A multi-layer body as set forth in claim 15, wherein-the multi-layer body is at least one of in the form of an applicable anti-reflection layer, in the form of an applicable diffuser, in the form of an applicable self-cleaning protective layer, in the form of an optical component or part of an optical component, in the form of an applicable decoration layer, in the form of an applicable layer for modifying surface friction, adapted for measuring or detecting gases and/or liquids and/or solids for biological and/or medical uses and in the form of a security element for the protection of documents and/or articles of value.

19. A transfer film, comprising:
a carrier film
a transfer layer portion having a structure layer, the transfer layer portion being arranged on the carrier film and being detachable from the carrier film, wherein a master relief structure is shaped on the carrier film on its side towards the structure layer and the structure layer on its side towards the carrier film has a relief structure complementary to the master relief structure of the carrier film, wherein the complementary relief structure includes a microstructure and wherein the structure layer is of a thickness<20 μm; and
an adhesive layer arranged on the transfer film on a side of the transfer film facing away from the carrier film, wherein the relief structure is in the form of a diffuser, wherein the spacing between two adjacent raised portions of the relief structure is less than 10 times the wavelength of the incident radiation.

20. A transfer film as set forth in claim 19, wherein the raised portions of the relief structure are in the form of microlenses of a diameter of between 3 μm and 80 μm.

21. A transfer film as set forth in claim 20, wherein-the microlenses are at least one of provided with a refractive index which decreases or increases from the edge of the microlens to the center point of the microlens and in the form of Fresnel lenses.

22. A transfer film, comprising:
a carrier film; and
a transfer layer portion having a structure layer, the transfer layer portion being arranged on the carrier film and being detachable from the carrier film, wherein a master relief structure is shaped on the carrier film on its side towards the structure layer and the structure layer on its side towards the carrier film has a relief structure complementary to the master relief structure of the carrier film, wherein the complementary relief structure includes a microstructure and wherein the structure layer is of a thickness<20 μm, wherein on its side towards the carrier film the structure layer is formed locally from different lacquers.

* * * * *